(12) United States Patent
Lee

(10) Patent No.: US 10,895,653 B2
(45) Date of Patent: Jan. 19, 2021

(54) METHOD OF FIRST ARRIVAL PICKING OF MULTI-CHANNEL SEISMIC SURVEY DATA CONSIDERING SOUND SOURCE-RECEIVER ARRAY

(71) Applicant: Korea Institute Of Geoscience And Mineral Resources, Daejeon (KR)

(72) Inventor: Ho-Young Lee, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 0 days.

(21) Appl. No.: 15/717,075

(22) Filed: Sep. 27, 2017

(65) Prior Publication Data

US 2018/0136351 A1     May 17, 2018

(30) Foreign Application Priority Data

Nov. 16, 2016 (KR) .......................... 10-2016-0152791

(51) Int. Cl.
G01V 1/36 (2006.01)
G01V 1/28 (2006.01)

(52) U.S. Cl.
CPC .................. *G01V 1/36* (2013.01); *G01V 1/28* (2013.01); *G01V 1/288* (2013.01); *G01V 2210/52* (2013.01)

(58) Field of Classification Search
CPC . G01V 1/288; G01V 1/36; G01V 1/48; G01V 2210/52; G01V 1/28
See application file for complete search history.

(56) References Cited

U.S. PATENT DOCUMENTS

| 5,073,876 A | * | 12/1991 | Propes | G01V 1/362 367/36 |
| 5,684,754 A | * | 11/1997 | Byun | G01V 1/362 367/21 |
| 5,742,740 A | * | 4/1998 | McCormack | G01V 1/288 706/14 |

(Continued)

FOREIGN PATENT DOCUMENTS

| EP | 2494378 B1 | 4/2014 |
| KR | 10-2001-0090027 A | 10/2001 |

(Continued)

OTHER PUBLICATIONS

Jubran Akram. "Automatic P-wave Arrival Time Picking Method for Seismic and Microseismic Data". Recovery: Energy Environment Economy. CSPG CSEG CWLS Convention. 2011.

(Continued)

*Primary Examiner* — Ian J Lobo
(74) *Attorney, Agent, or Firm* — Harness, Dickey & Pierce, P.L.C.

(57) ABSTRACT

Provided is a method of first arrival picking of multi-channel seismic survey data considering sound source-receiver array that can increase the reliability of a first arrival selected from land seismic survey data or marine seismic survey data that includes background noise. Further, provided is a method of first arrival picking of multi-channel seismic survey data considering source-receiver array, which can improve the reliability of a first arrival or a micro earthquake occurrence location selected from measurement data of a micro earthquake seismic survey.

4 Claims, 16 Drawing Sheets

(56) References Cited

U.S. PATENT DOCUMENTS

| | | | | |
|---|---|---|---|---|
| 2005/0174886 A1* | 8/2005 | Fuller | ............... | G01V 1/28 367/57 |
| 2014/0219054 A1* | 8/2014 | Mousa | ............... | G01V 1/364 367/43 |
| 2015/0177402 A1* | 6/2015 | Al-Shuhail | ............ | G01V 1/36 702/14 |
| 2016/0313460 A1 | 10/2016 | Berron et al. | | |
| 2017/0176621 A1* | 6/2017 | Valero | ............... | G01V 1/50 |

FOREIGN PATENT DOCUMENTS

| | | |
|---|---|---|
| KR | 20010090027 A | 10/2001 |
| KR | 101270885 B1 | 6/2013 |
| KR | 20160095690 A | 8/2016 |

OTHER PUBLICATIONS

Martin Gutowski et al. "Fast static correction methods for high-frequency multichannel marine seismic reflection data: A high-resolution seismic study of channel-levee systems on the Bengal Fan". Marine Geophysical Researches 23. Kluwer Academic Publishers. Jul. 12, 2002. pp. 57-75.

Jong Chon Kim et al. "Suppression of swell effect in high-resolution marine seismic data using cross-correlation scheme". Journal of the Korean Geophysical vol. 6 n 1. 2003. pp. 31-38.

Ho-Young Lee et al. "Resolution analysis of shallow marine seismic data acquired using an airgun and an 8-channel streamer cable". Journal of Applied Geophysics. Elsevier B.V. 2014. pp. 203-212.

Ho-Young Lee et al. "Suppression of Swell Effect in 3.5 kHz Subbottom Profiler Data". Journal of the Korea Society of Oceanography vol. 7, No. 3. Aug. 2002. pp. 95-99.

Ho-Young Lee et al. "High-resolution shallow marine seismic surveys off Busan and Pohang, Korea, using a small-scale multi-channel system". Journal of Applied Geophysics 56. Elsevier B.V. 2004. pp. 1-15.

C. Muller et al. Ultra-high-resolution marine 2D-3D seismic investigation of the Liman Tepe/Karantina Island archaeological site (Urla/Turkey). Journal of Applied Geophysics 68. 2009. pp. 124-134.

Ismael Vera Rodriguez. "Automatic Time-picking of Microseismic Data Combining STA/LTA and the Stationary Discrete Wavelet Transform". CSPG CSEG CWLS Convention. 2011. pp. 1-4.

Juan I. Sabbione et al. "A robust method for microseismic event detection based on automatic phase pickers". Journal of Applied Geophysics 99. 2013. pp. 42-50.

Joe Wong et al. "Automatic time-picking of first arrivals on noisy microseismic data". CSEG Conference. 2009.

Office Action of Korean Application No. 10-2016-0152791 dated Jan. 12, 2017.

Notice of Allowance of Korean Application No. 10-2016-0152791 dated May 4, 2017.

Akram, Jubran and David W. Eaton. "Refinement of arrival-time picks using an iterative, cross-correlation based workflow." *GeoConvention 2014: FOCUS* (2014): 1-6.

Sabbione, Juan I. and Danilo Velis. "Automatic first-breaks picking: New strategies and algorithms." *Geophysics* 75.4 (2010): V67-V76.

Wong, J. "Picking of first-arrival times on very large seismic datasets." *GeoConvention 2016: Optimizing Resources* (2016): 1-4.

Extended European Search Report dated Mar. 1, 2018 issued in corresponding European Application No. 17197473.6.

* cited by examiner

Result of first arrival selection without consideration of sound source-receiver array Result of first arrival selection with consideration of sound source-receiver array

METHOD OF FIRST ARRIVAL PICKING OF MULTI-CHANNEL SEISMIC SURVEY DATA CONSIDERING SOUND SOURCE-RECEIVER ARRAY

CROSS-REFERENCE TO RELATED APPLICATION

This application claims the benefit of Korean Patent Application No. 10-2016-0152791 filed on Nov. 16, 2016 in the Korean Intellectual Property Office, the entirety of which is incorporated herein by reference.

BACKGROUND OF THE INVENTION

1. Field of the Invention

The present invention relates to a method of first arrival picking of multi-channel seismic survey data considering sound source-receiver array, and more particularly, to a method of first arrival picking of multi-channel seismic survey data considering sound source-receiver array for improving the reliability of the first arrival selected from seismic measurement data that includes noise.

2. Description of the Related Art

A marine seismic survey is a technology wherein sound waves are generated in the sea water and are propagated to the seabed and the measured data of the sound waves reflected from the seabed is calculated to obtain images of the seafloor surface form and the subsurface stratum, to identify geological structure.

In the marine seismic survey, an air gun or sparker is used as a sound source for generating sound waves, and a streamer cable is used as a receiving device for receiving signals.

The length of the streamer cable varies from several tens of meters to several kilometers depending on the type of the exploration, the depth of the object, and the number of receiving channels. In the case of receiving data from multiple receiving sensors at the same time, this is called a multi-channel survey.

The marine seismic survey is performed as the sound source and the streamer cable are towed to the rear of a survey vessel and the survey vessel is sailed forward, while the sound source is blasted at a regular interval, the reflected signal is received at the sensor of the streamer cable, the received signal is recorded as digital data with recording equipment of the survey vessel.

Marine seismic survey measurement data are recorded for a certain time interval at a given sample interval from all channels from the time of sound wave generation. A series of data received from each channel is referred to as a trace, and a set of data including all the channels at the time of one blasting is referred to as a shot gather data.

Reclassification of shot gather data to data of a same point is referred to as a common depth point gather data. Sea bottom signal from seismic collection data such as the shot gather or the common depth point gather data is shown as a hyperbola form drawn according to the water depth and the arrangement of the sound source and receiver.

In each of the traces, the amplitude of the signal reflected from the boundary surface where the density and the propagation velocity change are large among the sea bottom and subsurface strata, is recorded. When these traces are continuously shown according to the progress of the blasting, a portion where the amplitude is large is continual, and a cross-section image of the stratum which seems to be similar to the shape of the subsurface structure can be obtained, and this is referred to as a seismic section.

However, the seismic measurement data includes, measurement error caused by the motion of the receiver due to the effect of sea swell, and multiple reflected waves in which reflected waves are repeatedly reflected again from the sea surface. The measurement errors due to sea swell and the multiple reflected waves cause degradation of image quality of the seabed surface form and subsurface stratum which are obtained based on marine seismic measurement data.

In order to improve the quality of the image obtained based on the seismic measurement data, it is necessary to accurately detect a first arrival capable of calculating a round-trip travel time to the sea bottom, and to eliminate measurement errors caused by sea swell and the influence of multiple reflected waves, from the image.

Conventional first arrival picking technologies are disclosed in, sea bottom location selection of marine seismic survey data (Gutowski et al., 2002; Lee et al., 2002; Kim et al., 2003; Lee et al., 2004; Lee et al., 2014) as well as tomography, refraction survey, or micro seismic survey (Wong et al., 2009; Akram, 2011; Rodriguez, 2011; Sabbione and Velis, 2013) and the like, and thus detailed descriptions thereof is omitted.

However, in seismic surveys that are performed at sea, sound waves are generated at sea, and after the generated sound waves reach the seabed and are reflected towards the sea surface, the reflected waves are collected, and when the waves existing on the sea collide with the sound source or receiver, the measured data cannot be prevented from containing unintentional noise.

As a result, with the seismic measurement data acquired through the seismic survey performed at sea, it was difficult to select the first arrival capable of calculating a round-trip travel time to the sea bottom, the selected first arrival was unreliable, and ultimately, there was a limit to increasing the resolution of images produced based on the measurement data.

In addition, with seismic measurement data obtained through a seismic survey performed on land, it was difficult to select a first arrival capable of calculating a round-trip travel time to a reflecting surface due to the noise generated in the ground, the selected first arrival was unreliable, and ultimately, there was a limit to increasing the resolution of images produced based on the measurement data.

In addition, when micro seismic surveys are performed on land or sea, because the intensity of the reflected waves reaching the receiver is very weak, unlike seismic surveys, the influence of the background noise can't help but be greater on the micro seismic surveys than seismic surveys.

Therefore, as the occurrence location of a micro earthquake in a micro seismic survey is selected from measurement data acquired from a borehole or ground surface, it was difficult to grasp the occurrence location of the micro earthquake due to the background noise included in the measurement data.

As prior arts, there are
(Patent Document 1) KR 10-2016-0095690 A1,
(Non-patent document 1) Akram, J., 2011. Automatic P-wave arrival time picking method for seismic and microseismic data. CSEG Conference Abstracts,
(Non-patent document 2) Gutowski, M., Breitzke, M., Spieβ, V., 2002. Fast static correction methods for high-frequency multichannel marine seismic reflection data: A high-resolution seismic study of channel-levee systems on the Bengal Fan. Marine Geophysical Researches 23, 57-75, (Non-patent document 3) Kim, J. C., Lee, H. Y., Kim, J. S., Kang, D. H., 2003. Suppression of swell effect in high-resolution marine seismic data using cross-correlation scheme. Journal of the Korean Geophysical Society 6, 31-38, (Non-patent document 4) Lee, H. Y., Kim, W., Koo, N. H., Park, K. P., Yoo, D. G., Kang, D. H., Kim, Y. G., Seo, G. S., Hwang, K. D., 2014. Resolution analysis of shallow marine seismic data acquired using an air gun and an 8-channel streamer cable. Journal of Applied Geophysics 105, 203-212, (Non-patent document 5) Lee, H. Y., Koo, N. H., Park, K. P., Kim, J. K., Kim, W. S., Kang, D. H., 2002. Suppression of swell effect in 3.5 kHz subbottom profiler data. The Sea (Bada) 7, 95-99, (Non-patent document 6) Lee, H. Y., Park, K. P., Koo, N. H., Yoo, D. G., Kang, D. H., Kim, Y. G., Hwang, K. D., Kim, J. C., 2004. High-resolution shallow marine seismic surveys off Busan and Pohang, Korea, using a small-scale multichannel system. Journal of Applied Geophysics 56, 1-15, (Non-patent document 7) Muller, C., Woelz, S., Ersoy, Y., Boyce, J., Jokisch, T., Wendt, G., Rabbel, W., 2009. Ultra-high-resolution marine 2D-3D seismic investigation of the Liman Tepe/Karantina Island archaeological site (Urla/Turkey). Journal of Applied Geophysics 68, 124-134, (Non-patent document 8) Rodriguez, I. V., 2011. Automatic time-picking of microseismic data combining STA/LTA and the stationary discrete wavelet transform. CSEG Conference Abstracts, (Non-patent document 9) Sabbione, J. I., Velis, D. R., 2013. A robust method for microseismic event detection based on automatic phase pickers. Journal of Applied Geophysics 99, 42-50, and (Non-patent document 10) Wong, J., Han, L., Bancroft, J., Stewart, R., 2009. Automatic time-picking of first arrivals on noisy microseismic data. CSEG Conference Abstracts.

SUMMARY OF THE INVENTION

The present disclosure is directed to providing a method of first arrival picking of multi-channel seismic survey data considering sound source-receiver array, which can increase the reliability of a first arrival selected from land seismic survey data or marine seismic survey data that includes background noise.

Further, the present disclosure is directed to providing a method of first arrival picking of multi-channel seismic survey data considering source-receiver array, which can improve the reliability of a first arrival or a micro earthquake occurrence location selected from measurement data of a micro earthquake seismic survey.

A method of first arrival picking of multi-channel seismic survey data considering sound source-receiver array may include: selecting a temporary first arrival value of each trace in a set configured to have a plurality of traces using any one of a conventional first arrival picking technology, deriving a transform set including the temporary first arrival values by performing a normal move-out using a sound source-receiver distance and a velocity of a medium so as to correct a time difference generated during measurement, subtracting a temporary first arrival value of a large deviation from the transform set, deriving a first arrival expected location by generating an average value of remaining temporary first arrival values in the transform set, deriving a true first arrival selection range by adding or subtracting an arbitrary error value to or from the average value of the temporary first arrival values, and selecting a true first arrival value within the true first arrival selection range using any one of the conventional first arrival picking technologies.

Further, the set configured to have a plurality of traces may be acquired through a seismic survey or a micro earthquake survey performed on land or sea.

Further, when the plurality of traces are acquired through a micro earthquake observation, a micro earthquake occurrence location is arbitrarily selected and a normal move-out is performed a multiple of times, and a micro earthquake occurrence location may be estimated based on a form of the transform set.

Further, subtracting the temporary first arrival value of a large deviation from the transform set may be performed until a standard deviation and a standard deviation decrease rate of the temporary first arrival values shown in the transform set becomes less than an arbitrary target value.

Further, the arbitrary error value added to or subtracted from the average value of the first arrival values may be calculated through a formula using a position or height change of a transceiver, a velocity of a medium, or a height of a wave as an independent variable.

Further, in deriving the true first arrival selection range, a range between values obtained by adding or subtracting an arbitrary error value to or from the average value may be derived as the true first arrival selection range.

Further, in deriving the first arrival expected location, a predicted first arrival hyperbola may be generated by substituting the average value into a formula that uses a sound source-receiver distance and a velocity of a medium.

Further, in deriving the range of the true first arrival selection range, a range between range hyperbolas generated by substituting a value obtained by adding or subtracting the arbitrary error value to or from the average value into the formula may be derived as the true first arrival selection range.

The method may further include verifying and supplementing a suitability of the true first arrival value in a set.

At this time, the step of verifying and supplementing a suitability of the true first arrival value in a set may include, performing a normal move-out to transform true first arrival values of each trace that forms a set into a transform set and determining whether a standard deviation of true first arrival values in the transform set is less than a suitability evaluation value, and if the standard deviation of true first arrival values in the transform set is greater than the suitability evaluation value, the step may include substituting a true first arrival value of a large deviation with a first arrival expected location value.

The method may further include re-verifying and supplementing a suitability of a true first arrival value through comparison between sets.

At this time, through comparison between sets, the step of re-verifying and supplementing a suitability of a true first arrival value may include comparing a true first arrival value of a certain trace of a certain set and a true first arrival value of a certain trace of an arbitrary set to calculate a difference value and determining whether a difference value is less than a continuity evaluation value, and if the difference value is greater than the continuity evaluation value, the step may include determining whether a true first arrival value standard deviation of traces in a transform set of the certain set is less than an arbitrary comparison value, and if a true first arrival value standard deviation of traces of the certain set is greater than the arbitrary comparison value, the step may include substituting a true first arrival value of a certain trace of the certain set with a first arrival expected location value of a certain trace of the certain set or an average of a true first arrival value of certain traces of an arbitrary set.

Further, the difference value may be calculated by subtracting a true first arrival value of a certain trace of the arbitrary set from a true first arrival value of a certain trace of the certain set, or may be calculated by subtracting an average of a true first arrival value of certain traces of the arbitrary set from a true first arrival value of a certain trace of the certain set.

Further, the present disclosure may provide a storage medium storing a computer program for implementing a method of first arrival picking of multi-channel seismic survey data considering sound source-receiver array.

The details of other embodiments are included in the 'detailed description of the invention' and the accompanying drawings.

The advantages and/or features of the present invention and the manner of achieving them will become apparent by reference to various embodiments described in detail below with reference to the accompanying drawings.

However, the present invention is not limited to the configurations of the embodiments described below, but may be embodied in various other forms, and each embodiment disclosed in this specification is intended to be illustrative only, and it will be understood by those of ordinary skill in the art that various changes in form and details may be made therein without departing from the spirit and scope of the invention as defined by the appended claims.

According to the present invention, it is possible to increase the reliability of a first arrival selected from land or marine seismic survey measurement data that includes noise.

In addition, it is possible to improve the reliability of a first arrival or a micro earthquake occurrence location selected from micro earthquake survey measurement data that includes noise.

In addition, it is possible to prevent an error of selecting a noise before a first arrival or a strong signal etc. as a first arrival.

In addition, since the reliability of a first arrival picking is evaluated by comparing a standard deviation of the selected true first arrival with a threshold value (suitability evaluation value), the reliability of the selected true first arrival may be maintained at a target value.

In addition, it is possible to repeatedly review the reliability of a selected true first arrival, by comparing a difference of a true first arrival average of a certain trace from a plurality sets classified by measured location, or a true first arrival of an immediately preceding set and a selected true first arrival, with a threshold value (continuity evaluation value).

Ultimately, a first arrival of high reliability may be selected from seismic measurement data that includes noise, and it is possible to obtain high resolution images of seabed surface forms and subsurface stratum.

On the other hand, it may be applied to a first arrival picking of main reflection layer even in a land seismic survey. In the case where the present invention is applied to a micro earthquake survey, the location of a crack (the location where a sound wave is generated) may be estimated.

In addition, it can also be used to select main reflected wave events that are reflected from the main subsurface layer below the seabed or earth's surface.

DETAILED DESCRIPTION OF THE INVENTION

Figure 1:
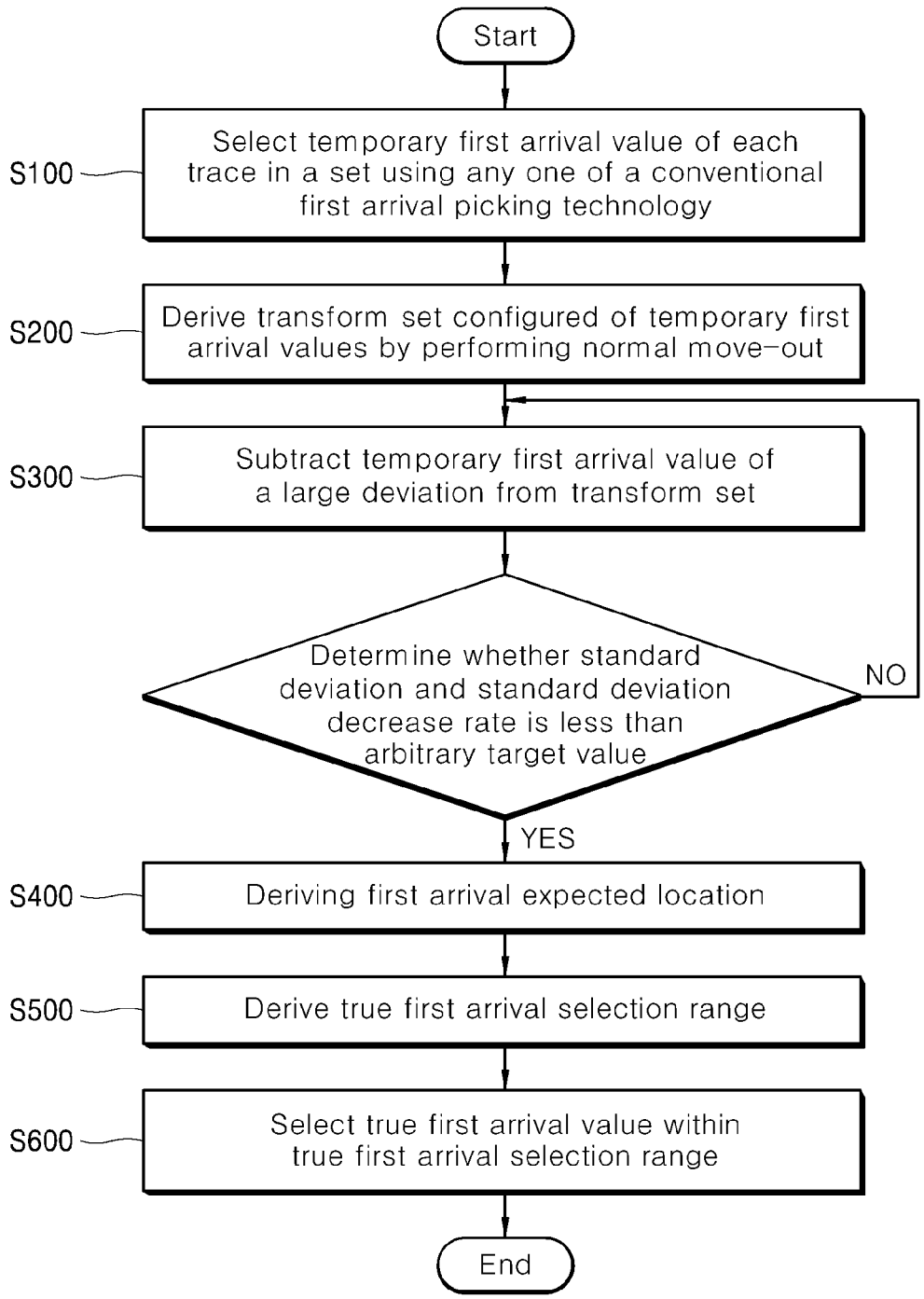
FIG. 1 is a flow chart of a method of first arrival picking of multi-channel seismic survey data considering sound source-receiver array according to an embodiment of the present invention.

Hereinafter, an exemplary embodiment of the present invention will be described in detail with reference to accompanying drawings.

Before describing the present invention in detail, terms and words used herein should not be construed in an ordinary or dictionary sense and should not be construed as limiting the invention to the inventors of the present invention in the best way possible, and it is to be understood that the concepts of various terms can be properly defined and used, and further, these terms and words should be construed as meaning and concept consistent with the technical idea of the present invention.

That is, the terms used herein are used only to describe preferred embodiments of the present invention, and are not intended to specifically limit the contents of the present invention, and it should be noted that this is a defined term considering that many possibilities of the present invention.

Also, in this specification, the singular forms "a", "an", and "the" include plural referents unless the context clearly dictates otherwise, and similarly it should be understood that even if they are expressed in plural they may include singular meaning.

Where a component is referred to as "comprising" another component throughout this specification, unless specified otherwise, this means the component does not exclude any other element but may further include any other element.

Further, when it is stated that an element is "inside or connected to another element", this element may be directly connected to another element or may be installed in contact with it, or may be installed spaced apart with a predetermined distance, and in the case where a component is installed to be spaced apart with a predetermined distance, a third component or means for fixing or connecting the component to another component may be present, and it should be noted that the description of the third component or means may be omitted.

On the other hand, it should be understood that there is no third component or means when an element is described as being "directly coupled" or "directly connected" to another element.

Likewise, other expressions that describe the relationship between the components, such as "between" and "right between ~", or "neighboring to" and "directly adjacent to" and such should be understood in the same spirit.

Further, in this specification, when terms such as "one surface", "other surface", "one side", "other side", "first", "second" and such are used, it is to clearly distinguish one component from another, and it should be understood that the meaning of the component is not limited by such term.

It is also to be understood that terms related to positions such as "top", "bottom", "left", "right" in this specification are used to indicate relative positions in the drawings for the respective components, and unless an absolute position is specified for these positions, it is not to be understood that these position-related terms refer to absolute positions.

Furthermore, in the specification of the present invention, the terms "part", "unit", "module", "device" and the like mean a unit capable of handling one or more functions or operations, and may be implemented as a hardware or software, or a combination of hardware and software.

In addition, in this specification, the same reference numerals are used for the respective constituent elements of the drawings, and the same constituent elements are denoted by the same reference numerals even if they are shown in different drawings, that is, the same reference numerals indicate the same components throughout this specification.

It is to be understood that the size, position, coupling relationships and such, of each component constituting the present invention in the accompanying drawings, may be partially exaggerated or reduced or omitted to be able to sufficiently clearly convey the scope of the invention or for convenience of describing, and therefore the proportion or scale thereof may not be rigorous.

Also, in the following description of the present invention, a detailed description of a configuration that is considered to unnecessarily obscure the gist of the present invention, for example, a known technology including the prior art, may be omitted.

As shown in FIGS. 1 to 13, a method of first arrival picking of multi-channel seismic survey data considering sound source-receiver array includes, selecting a temporary first arrival value of each trace in a set configured to have a plurality of traces using any one of a conventional first arrival picking technology in step S100, deriving a temporary line shape first arrival expected location 250 from a transform set including the temporary first arrival values by performing a normal move-out using a sound source 100-receiver 200 distance and a velocity of a medium so as to correct a time difference generated during measurement in step S200, subtracting a temporary first arrival value of a large deviation from the transform set or from the temporary hyperbola shape first arrival expected location 260 from the seismic signal set in step S300, deriving a first arrival expected location 300 by generating an average value of remaining temporary first arrival values in the transform set in step S400, deriving a true first arrival selection range 400 by adding or subtracting an arbitrary error value to or from the average value of the temporary first arrival values in step S500, and selecting a true first arrival value within the true first arrival selection range 400 using any one of the conventional first arrival picking technologies in step S600.

The set configured to have a plurality of traces is acquired through a seismic survey or a micro earthquake survey performed on land or sea.

In the case where the plurality of traces are acquired through a micro earthquake observation, a micro earthquake occurrence location is arbitrarily selected and a normal move-out is performed a multiple of times, and a micro earthquake occurrence location may be estimated based on a form of the transform set.

In the case where a seismic survey is performed, a sound source 100-receiver 200 array is known, but in the case of micro earthquake surveys, an observer cannot know the occurrence location of the micro earthquake. Therefore, as described above, by arbitrarily selecting the occurrence location of a micro earthquake and performing a normal move-out a multiple of times, in reverse, the occurrence location of a micro earthquake is estimated.

Figure 2:
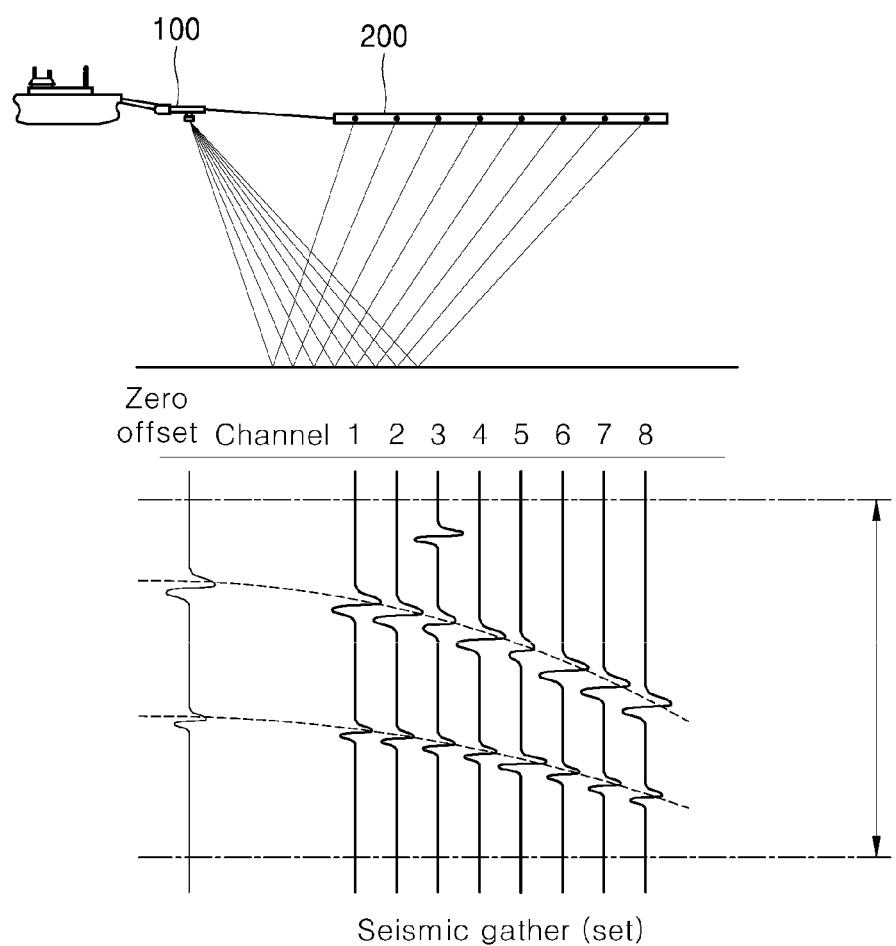
FIG. 2 is an exemplary view of a seismic survey performed at sea and an exemplary view of a set.

In FIG. 2, an exemplary view of a seismic survey performed at sea and an exemplary view of measurement data acquired through a seismic survey, that is, a set showing a plurality of traces is shown.

When a sound wave is generated from a sound source 100, each receiver 200 receives a reflected wave and the received signal is recorded as measurement data. In such measurement data, strong noise and strong subsurface signals that may cause error in first arrival picking is included.

In selecting a temporary first arrival value in step S100, since the location of a first arrival cannot be known specifically, a large range that can include first arrivals is set, and a temporary first arrival value is selected by using any one of conventional first arrival picking technologies.

Figure 3:
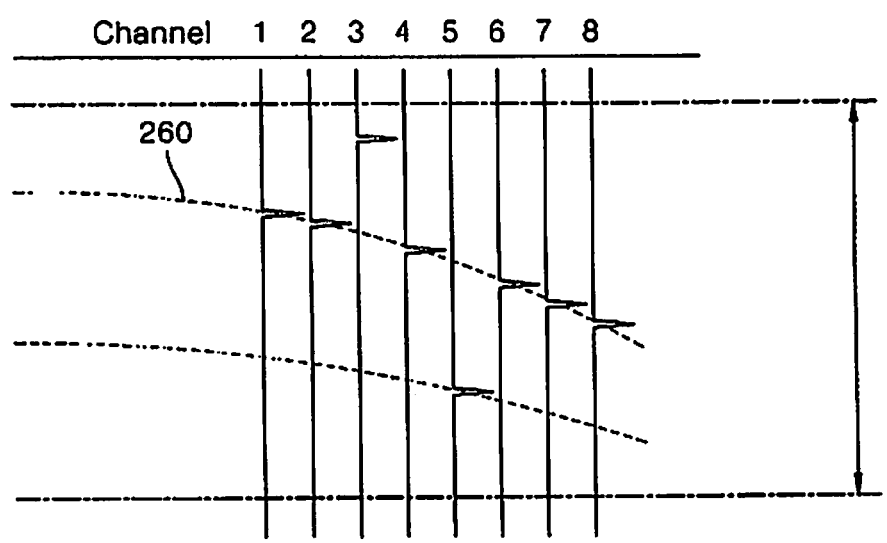
FIG. 3 is an exemplary view of temporary first arrival values selected from seismic survey measurement data according to the flow chart of FIG. 1.

In FIG. 3, a temporary first arrival value selected using a conventional first arrival picking technology from seismic survey measurement data shown in the exemplary view of the set of FIG. 2 is illustrated.

Figure 4:
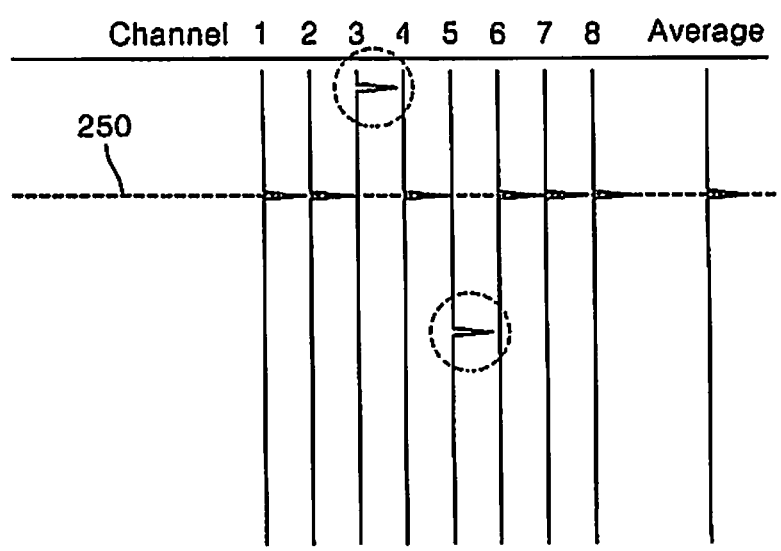
FIG. 4 is an exemplary view of a transform set showing temporary first arrival values derived by performing a normal move-out according to the flow chart of FIG. 1.

Further, in FIG. 4 a transform set derived through step S200 is shown. In step S200, a transform set showing a temporary first arrival value through a normal move-out is derived. A normal move-out is a data correction method that transforms measurement data into data that is recorded when the sound source 100 and receiver 200 is at the same location, that is, at a zero offset location.

In the case where there are no reefs or faults on the seabed, if a deviation of a temporary first arrival value of one trace is larger than that of the other first arrival value of several traces, it can be judged that the selection is wrong. As shown in FIG. 4, when the conventional first arrival picking technology is applied, it can be seen that strong noises before the first arrival or strong subsurface signals can be selected as the first arrival.

In FIGS. 5A to 5D, a set showing a temporary first arrival value selected from micro earthquake measurement data where a sound source location cannot be known (FIG. 5A), a transform set not reaching a zero offset which is a result of estimating the location of a sound source as several places and performing normal move-out (FIG. 5B), a transform set close to a zero offset (FIG. 5C), and a transform set exceeding a zero offset (FIG. 5D) is shown.

Figure 5A:
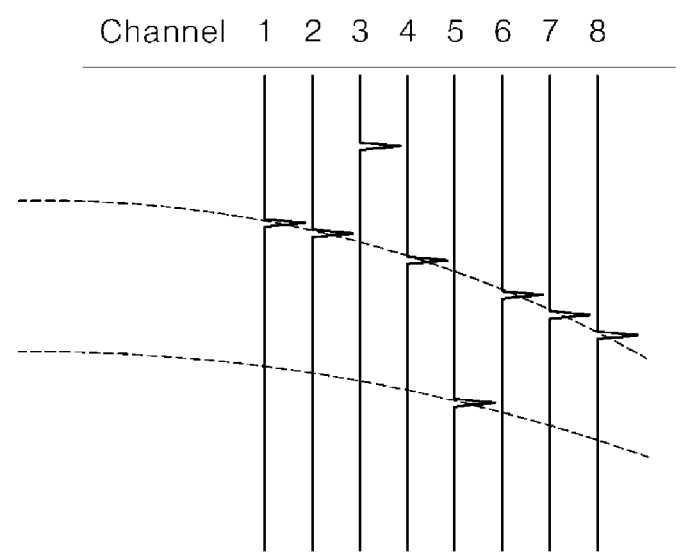
FIG. 5A to 5D are exemplary views of a transform set that is derived by arbitrarily selecting a micro earthquake occurrence location to perform a normal move-out a multiple of times.
Figure 5B:
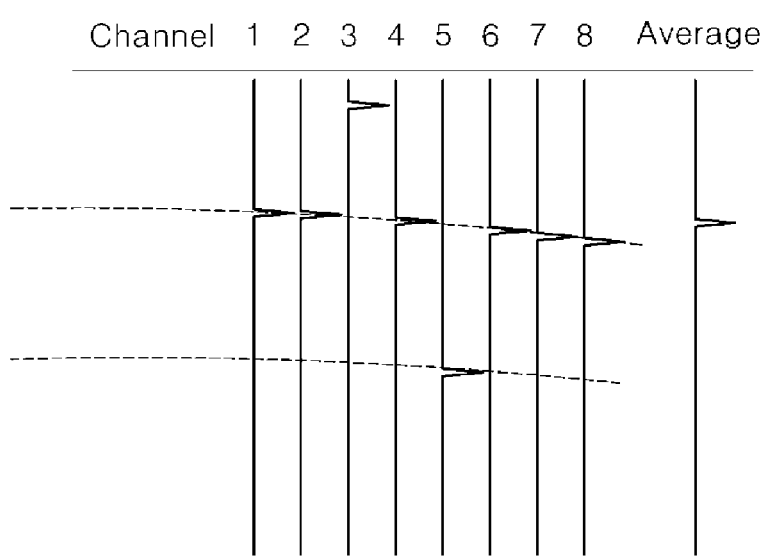
Figure 5C:
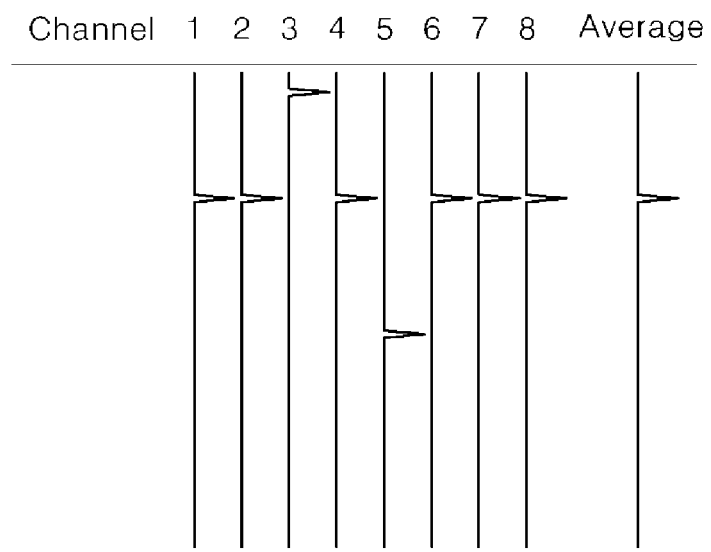
Figure 5D:
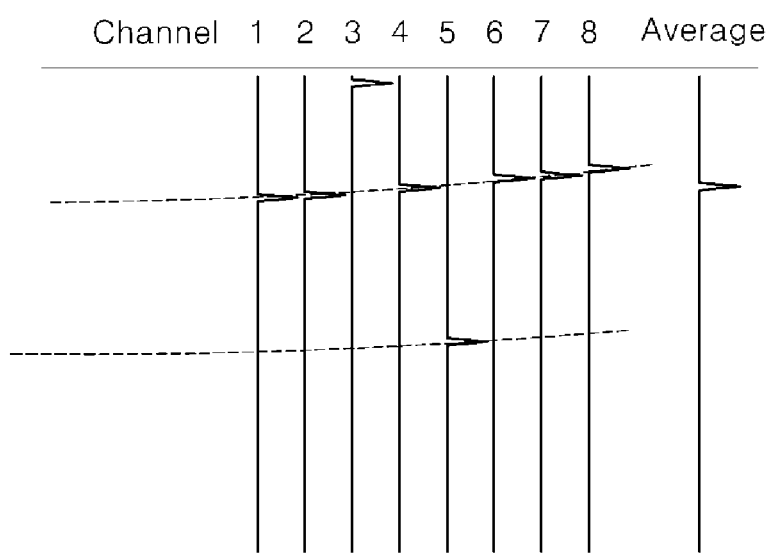

In the case where one of conventional first arrival picking technologies is used to select the first arrival value (FIG. 5A), a transform set such as the ones shown in FIG. 5B or FIG. 5D is obtained.

In one embodiment of the present invention, subtracting a temporary first arrival value of a large deviation from the transform set in step S300 is performed a multiple of times along the location of a sound source, to correct the transform set of FIG. 5B or FIG. 5D to the transform set of FIG. 5C.

Further, subtracting the temporary first arrival value of a large deviation from measurement data of a seismic survey or a micro earthquake survey from a transform set in step S300 is performed until a standard deviation of the temporary first arrival values and a standard deviation decrease rate shown in the transform set becomes less than an arbitrary target value.

Figure 6:
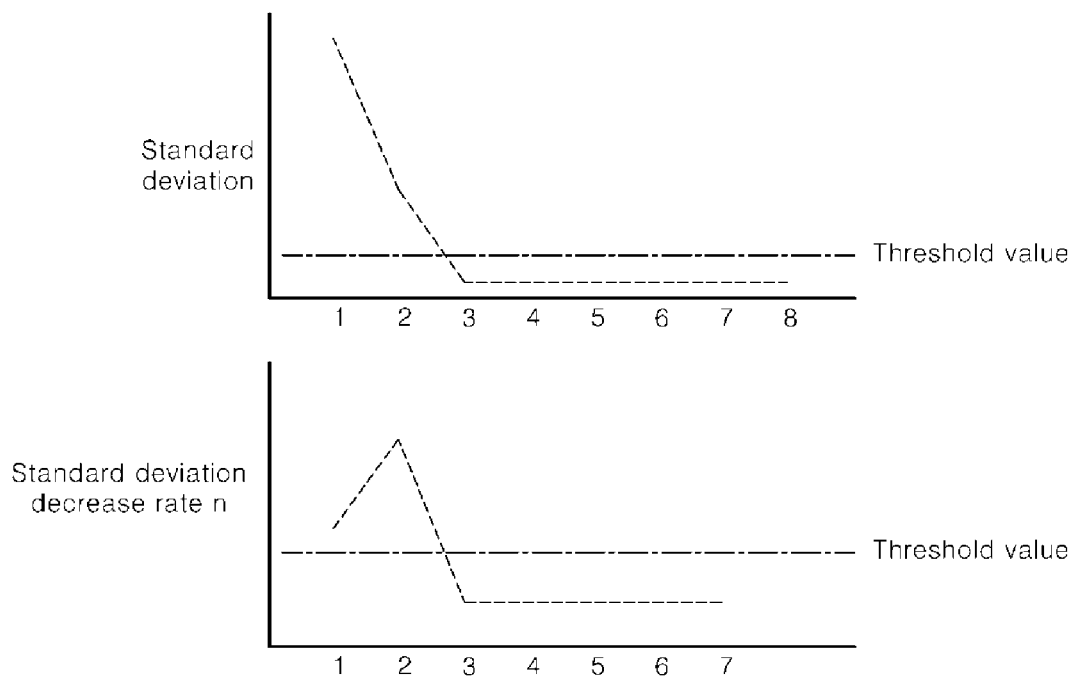
FIG. 6 is an exemplary view showing change in standard deviation and standard deviation decrease rate.

In FIG. 6, the change in standard deviation and standard deviation decrease rate, in the case where the subtraction of a temporary first arrival value of large deviation in step S300 is performed sequentially, is shown as a graph.

In the case where a temporary first arrival value of a large defective deviation among the selected temporary first arrival values are sequentially excluded, the standard deviation of the temporary first arrival values becomes less than or equal to the threshold value, and the standard deviation decrease rate also becomes less than or equal to the threshold value.

At this time, the decrease rate is expressed by the following equation 1, and as the standard deviation is minutely decreased, the decrease rate value is also decreased.

$$\text{Decrease rate}_n = \frac{\text{Standard deviation}_n}{\text{Standard deviation}_{n+1}} \quad \text{[Equation 1]}$$

In the case where each of the standard deviation and decrease rate of the temporary first arrival values are less than or equal the threshold value, an average of the remaining temporary first arrival values in a transform set is calculated.

The calculated average is a round-trip travel time at a zero offset location of FIG. 2, and more accurately, it is a round-trip travel time when a sound source 100 and each receiver 200 is at the same location, wherein in a transform set, it is a first arrival expected location 300, and in a set before a normal move-out transformation, is shown as a hyperbola which is the first arrival expected location 300.

This is described in further details in the following. In deriving the first arrival expected location 300 in step S400, an average value of the temporary first arrival values remaining in a transform set is calculated to derive the first arrival expected location 300 from the transform set.

If this average value is substituted into a formula using a sound source 100-receiver 200 distance and a velocity of a medium, that is, a reverse formula of a normal move-out, to generate a first arrival expected location 300 of each trace, a first arrival expected location 300 graph having a hyperbola shape may be illustrated in a set before the transformation.

Meanwhile, in the case where a first arrival expected location 300 is selected as a first arrival, measurement error cannot be excluded. This is because normally a first arrival location is on a straight line in a transform set and on a hyperbola in a set before the transformation, but can be moved to some extent due to a velocity error of a seismic wave in a medium and an error of a sound source 100-receiver 200 array distance.

Further, the vertical movement of a sound source 100 and a receiver 200 caused by waves in a marine seismic survey also changes the location of a first arrival.

Therefore, it is necessary to expand a first arrival selection range in consideration of a seismic wave velocity in a medium and an expected error range.

Thus, in step S500 of deriving a true first arrival selection range 400, an arbitrary error value is selected, and the selected arbitrary error value is added to or subtracted from a first arrival expected location 300 to expand the range.

That is, a measurement error is considered to expand the range from a first arrival expected location 300, to derive a true first arrival selection range 400.

Deriving a true first arrival range 400 from a transform set or a set before a transformation is explained in more detail below.

In a transform set, values obtained by having an arbitrary error value added to or subtracted from an average value are marked on a line parallel to an x-axis to derive a true first arrival selection range 400.

In a set before a transformation, a value obtained by having an arbitrary error value added to or subtracted from an average value is substituted into a formula to generate a range hyperbola, and the range hyperbola is shown to be positioned at an upper side and a lower side of a first arrival expected hyperbola, to derive a true first arrival selection range 400.

An arbitrary error value added to or subtracted from a first arrival expected location 300 value may be calculated through a formula that uses a position or height change of a transceiver, a velocity of a medium, or a height of a wave as an independent variable.

It is desirable to set the height of the wave to be at maximum 3 meters or less. In case of a seismic survey or a micro earthquake survey performed on land, the wave height is excluded.

Figure 7:
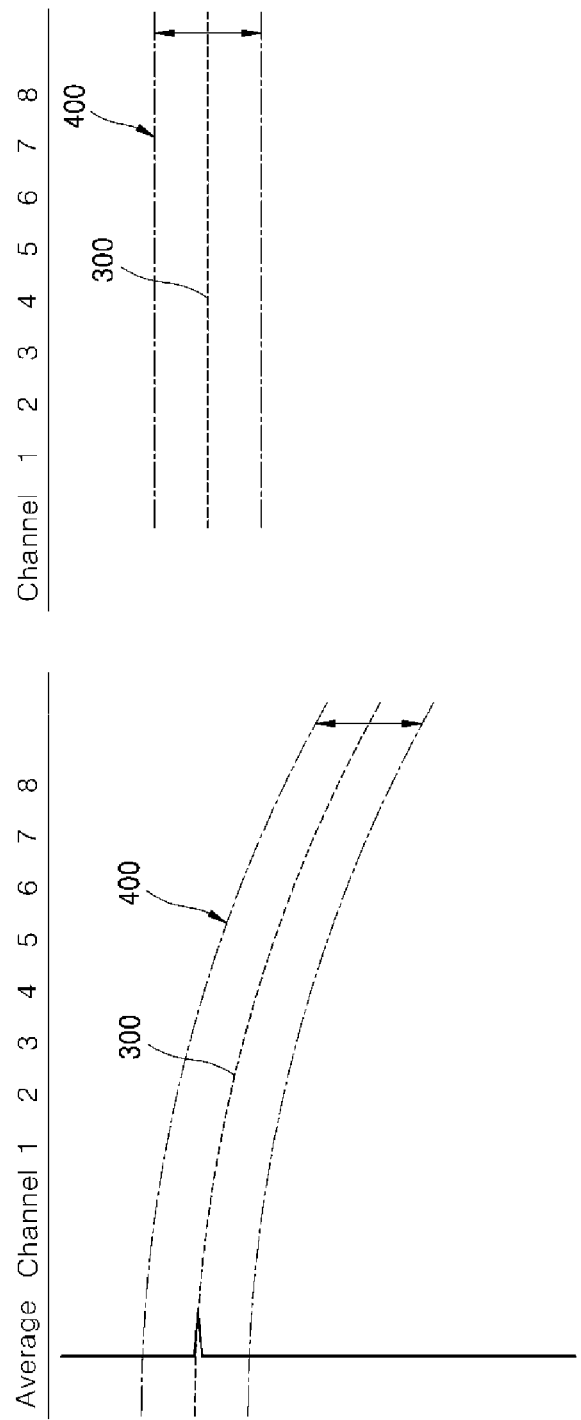
FIG. 7 is an exemplary view of a first arrival expected location selected according to the flowchart of FIG. 1 and a true first arrival selection range.
Figure 8:
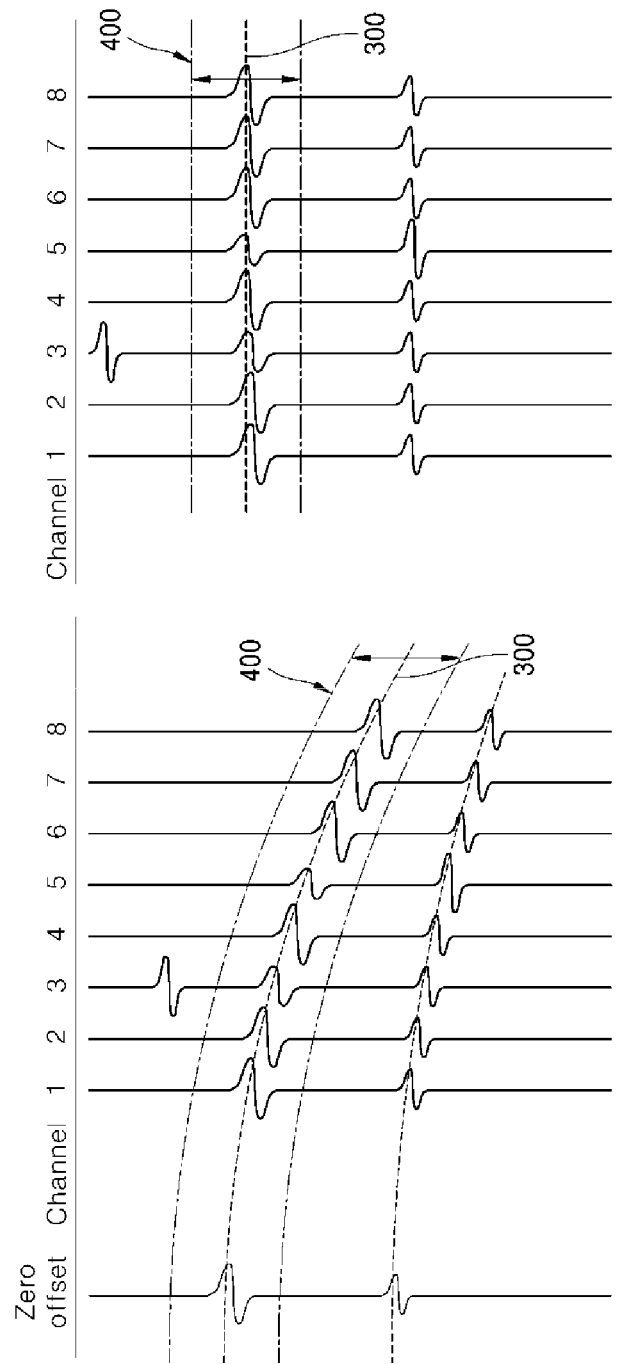
FIG. 8 is an exemplary view of a true first arrival selection range shown in a set and a transform set according to the flow chart of FIG. 1.
Figure 9:
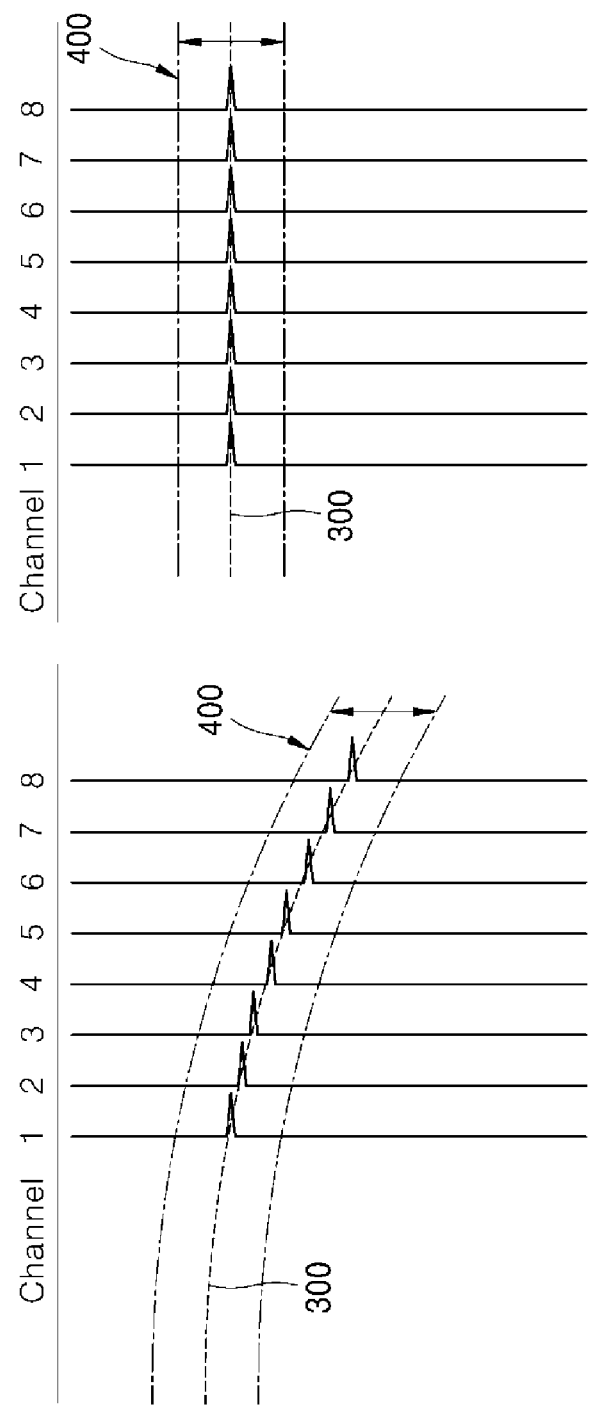
FIG. 9 is an exemplary view of a true first arrival value selected from a true first arrival selection range according to the flow chart of FIG. 1.
Figure 10:
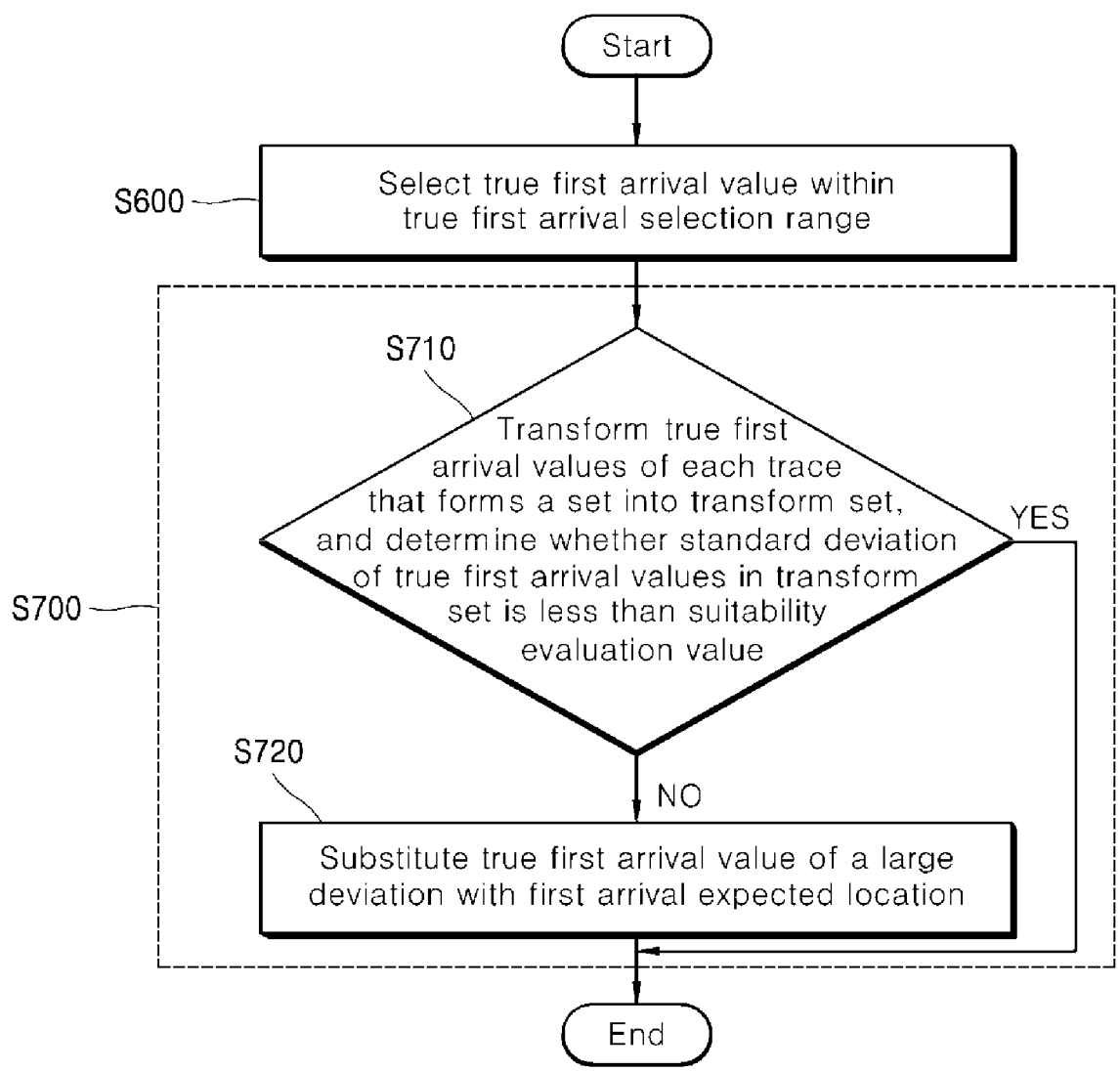
FIG. 10 is a flow chart showing a step of verifying and supplementing a suitability of a true first arrival value in one set which is performed after the procedure of the flow chart of FIG. 1.

In FIG. 7, a true first arrival selection range 400 having a range expanded from a first arrival expected location 300 by having an arbitrary error value added to or subtracted from a first arrival expected location 300 is shown. In FIG. 8, a set before a transformation and transform set including a true first arrival selection range 400 is shown. In FIG. 9, a set and a transform set marked with a true first arrival value selected within a true first arrival selection range 400.

When selecting a true first arrival value in step S600, a true first arrival value is selected within a true first arrival selection range 400 using any one of conventional first arrival picking technologies.

Thus, a noise that is stronger than a first arrival signal received by a receiver 200 before receiving a first arrival signal, or a lower part signal that is stronger than a first arrival signal after receiving a first arrival signal, is excluded from the true first arrival selection range 400, a good true first arrival value can be obtained, as shown in FIG. 9.

According to the embodiment of the present invention configured as above, a better true first arrival value is obtained as compared with the first arrival selected through a conventional first arrival picking technology.

Not being satisfied with this, in order to evaluate the suitability of the obtained true first arrival value and improve that reliability of the selected true first arrival value, the present invention further includes verifying and supplementing the suitability of the true first arrival value within one set in step S700.

Verifying and supplementing a suitability of a true first arrival value in a set in step S700 includes, performing a normal move-out to transform true first arrival values of each trace that forms a set into a transform set and determining whether a standard deviation of true first arrival values in the transform set is less than a suitability evaluation value in step S710, and if the standard deviation of true first arrival values in the transform set is greater than the suitability evaluation value, the step includes substituting a true first arrival value of a large deviation with a first arrival expected location value 300 in step S720.

The suitability evaluation value is a value obtained by having 4 added to or subtracted from an average value, wherein the value added to or subtracted from an average value may be changed and calculated according to experience and necessity.

Figure 11A:
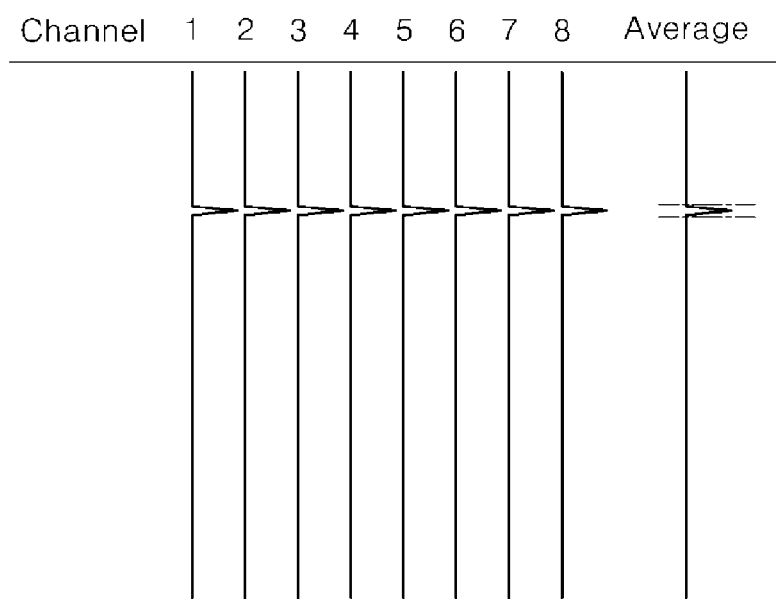
FIG. 11A to 11C are exemplary views of a transform set showing true first arrival values selected by performing a normal move-out according to the flow chart of FIG. 10.
Figure 11B:
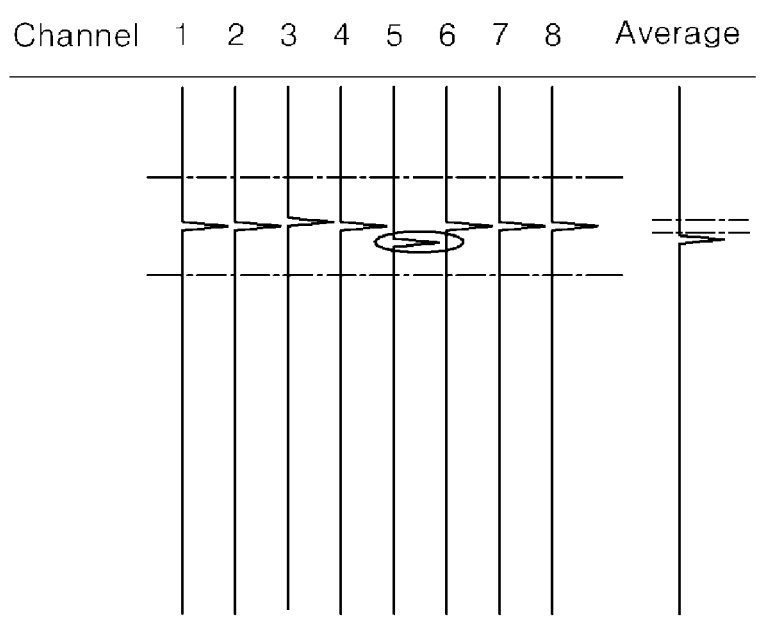
Figure 11C:
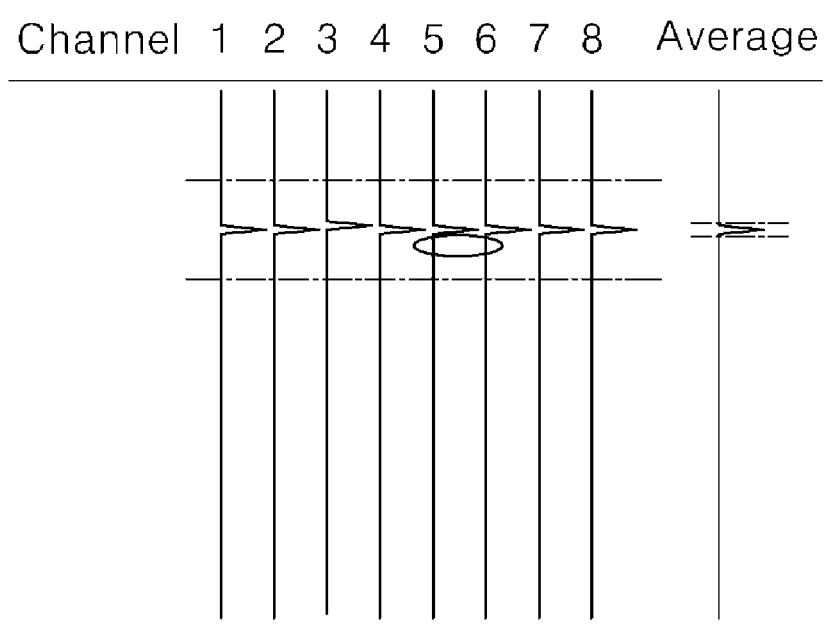

In FIGS. 11A to 11C, a transform set showing true first arrival values selected from data that do not include noise, calculated through an exemplary embodiment of the present invention (FIG. 11A), a transform set wherein standard deviation of true first arrival values selected from data that includes noise is greater than a suitability evaluation value (FIG. 11B), a transform set wherein a standard deviation of true first arrival values became smaller than a suitability evaluation value after a true first arrival value of a large deviation, selected from data where a standard deviation of a true first arrival value is greater than a suitability evaluation value, is substituted with a first arrival expected location 300 (FIG. 11C) is shown.

In the case where the standard deviation of true first arrival values in the transform set is greater than the suitability evaluation value due to a true first arrival value of a large deviation as shown in FIG. 11B, if the true first arrival value of a large deviation is substituted with a first arrival expected location 300 value, a transform set such as the ones shown in FIG. 11A or FIG. 11C can be obtained. That is, the reliability of a true first arrival result can be improved.

Meanwhile, when a seismic survey is in progress, measurement data is generated in sets. If the water depth does not change rapidly, a first arrival value of the measurement data included in a previous set and that of a currently generated measurement data will not change significantly.

Further, a first arrival value of measurement data of a current set and that of measurement data included in a plurality of sets adjacent to the current set will not show much difference. That is, there is a characteristic in that the depth of the sea floor, which is the first arrival of a marine seismic survey, does not change drastically.

Figure 12:
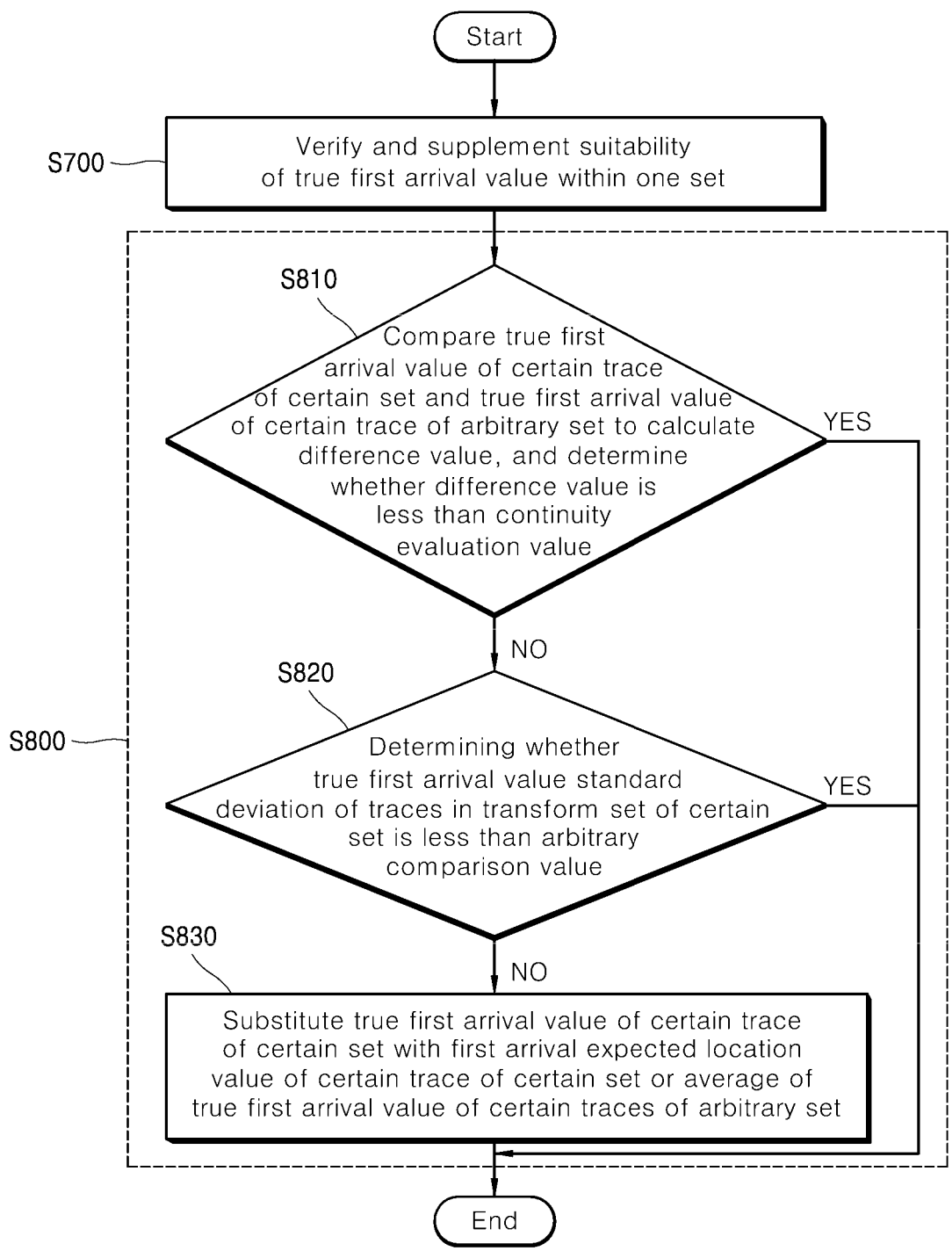
FIG. 12 is a flowchart showing a step of re-verifying and supplementing a suitability of a true first arrival value through comparison between sets performed after the procedure of the flow chart of FIG. 10.

On the basis of such seabed continuity, an exemplary embodiment of the present invention improves the reliability of a true first arrival value, through comparison between sets to perform re-verifying and supplementing a suitability of a true first arrival value in step S800, as shown in FIG. 12.

Through comparison between sets, re-verifying and supplementing a suitability of a true first arrival value in step S800 includes comparing a true first arrival value of a certain trace of a certain set and a true first arrival value of a certain trace of an arbitrary set to calculate a difference value and determining whether a difference value is less than a continuity evaluation value in step S810, and if the difference value is greater than the continuity evaluation value, the step includes determining whether a true first arrival value standard deviation of traces in a transform set of the certain set is less than an arbitrary comparison value in step S820, and if a true first arrival value standard deviation of traces of the certain set is greater than the arbitrary comparison value, the step includes substituting a true first arrival value of a certain trace of the certain set with a first arrival expected location value 300 of a certain trace of the certain set or an average of a true first arrival value of certain traces of an arbitrary set in step S830.

Here, the certain set means a set to be currently verified, and the arbitrary set means other sets excluding the certain set. The certain trace means measurement data generated through a certain receiver 200.

The difference value is calculated by subtracting a true first arrival value of a certain trace of the arbitrary set from a true first arrival value of a certain trace of the certain set, or is calculated by subtracting an average of a true first arrival value of certain traces of the arbitrary set from a true first arrival value of a certain trace of the certain set.

Further, the present disclosure may provide a storage medium storing a computer program for implementing a method of first arrival picking of multi-channel seismic survey data considering sound source-receiver array.

Figure 13:
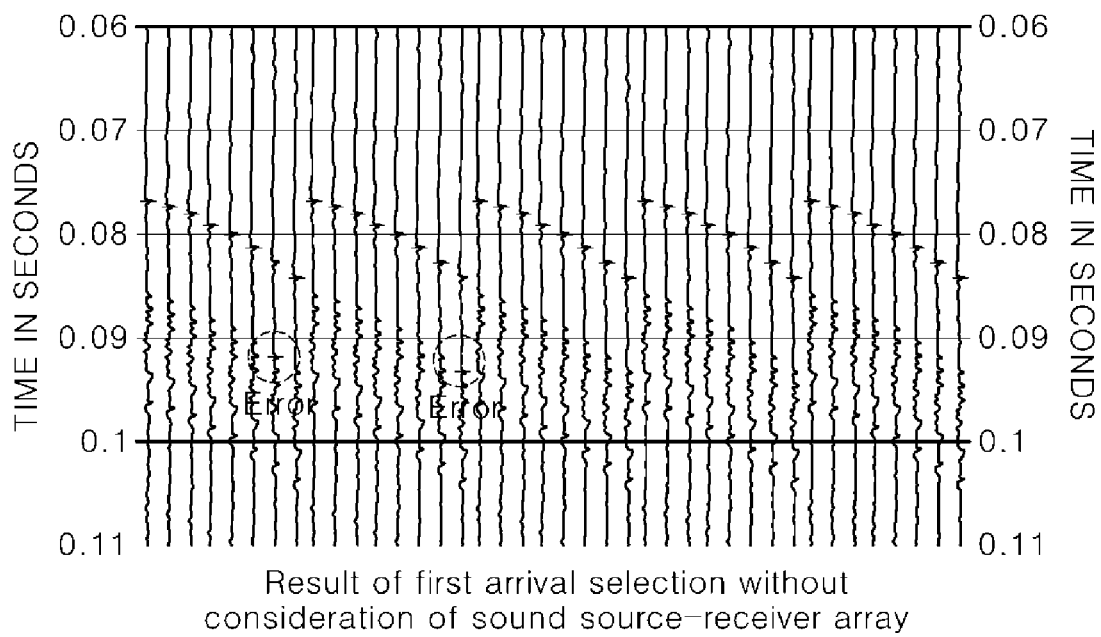
FIG. 13 is a first arrival selection result according to the flow chart of FIG. 1 and a first arrival selection result set according to a conventional method.
Figure 13:
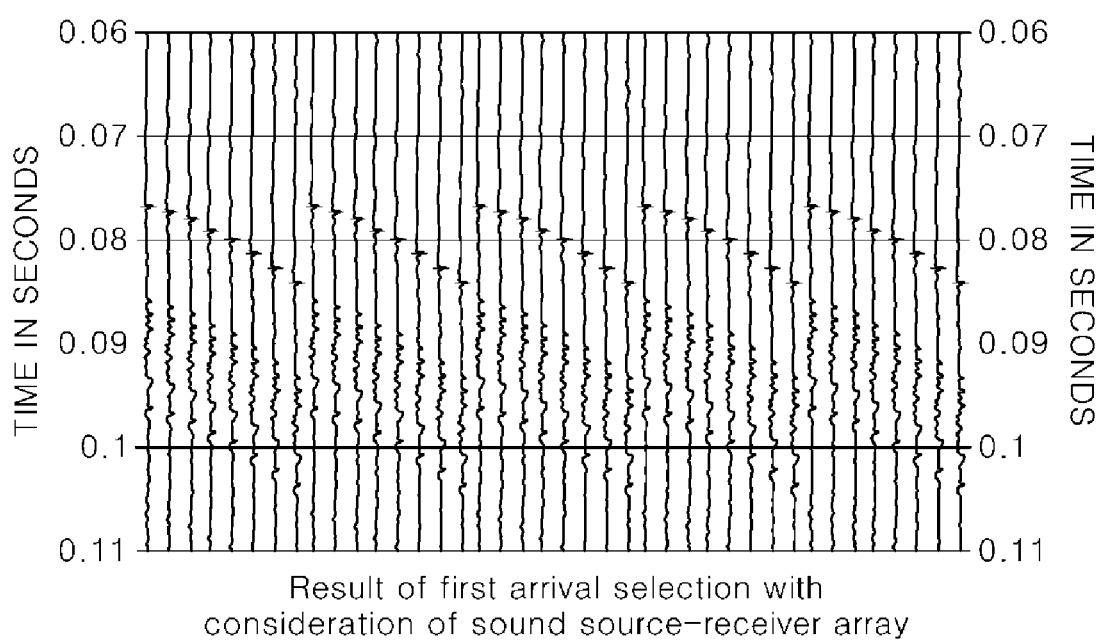

In FIG. 13, a result of having applied a method for first arrival picking according to an exemplary embodiment of the present invention to an actual measurement data acquired from a site is shown. The first arrival selected of the measurement data is marked with (–).

As shown in FIG. 13, when an exemplary embodiment of the present invention was not applied, an error occurred in selecting a first arrival, but when an exemplary embodiment of the present invention was applied, an error did not occur, thereby enabling a more stable selecting of a first arrival.

According to the present invention configured as described above, it is possible to increase the reliability of a first arrival selected from land or marine seismic survey measurement data that includes noise.

In addition, it is possible to improve the reliability of a first arrival or a micro earthquake occurrence location selected from micro earthquake survey measurement data that includes noise.

Particularly, through conventional methods of first arrival picking, a temporary first arrival of a plurality of traces measured with a plurality of receivers 200 is selected respectively, a signal is transformed to a signal received in a vertical direction using a sound source 100-receiver 200 array distance and velocity of a medium, and after subtracting a temporary first arrival, which is recognized as a measurement error due to a large deviation among the selected temporary first arrivals, the sound source 100-receiver 200 array distance and the velocity of the medium is used to determine a first arrival range having a hyperbola shape, and a true first arrival is reselected for each trace in the range, so it is possible to prevent an error of selecting a noise before a first arrival or a strong signal etc. as a first arrival.

In addition, since the reliability of a first arrival picking is evaluated by comparing a standard deviation of the selected true first arrival with a threshold value (suitability evaluation value), the reliability of the selected true first arrival may be maintained at a target value.

In addition, it is possible to repeatedly review the reliability of a selected true first arrival, by comparing a difference of a true first arrival average of a certain trace from a plurality sets classified by measured location, or a true first arrival of an immediately preceding set and a selected true first arrival, with a threshold value (continuity evaluation value).

Ultimately, a first arrival of high reliability may be selected from seismic measurement data that includes noise, and it is possible to obtain high resolution images of seabed surface forms and subsurface stratum.

On the other hand, it may be applied to a first arrival picking of main reflection layer even in a land seismic survey. In the case where the present invention is applied to a micro earthquake survey, the location of a crack (the location where a sound wave is generated) may be estimated.

In addition, it can also be used to select main reflected wave events that are reflected from the main subsurface layer below the seabed or earth's surface.

While the present invention has been particularly shown and described with reference to exemplary embodiments thereof, it is evident that many alternatives, modifications and variations will be apparent to those skilled in the art. It will be understood by those skilled in the art that various changes in form and details may be made therein without departing from the spirit and scope of the invention as defined by the appended claims.

In addition, since the present invention can be embodied in various forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

EXPLANATION OF LETTERS OR NUMERALS

100: sound source
200: receiver
250: temporary line-shape first arrival expected location
260: temporary hyperbola-shape first arrival expected location
300: true first arrival expected location
400: true first arrival selection range

What is claimed is:

1. A method of hyperbola-shape first arrival picking of multi-channel seismic survey data using a source-receiver distance and a velocity in a medium, comprising:
    selecting a temporary first arrival value of each trace in a seismic signal set configured to have a plurality of traces for identifying a geological structure and a characteristic and obtaining an image using an amplitude of a seismic signal and performing a normal move-out correction through a travel time formula of reflected wave using a source-receiver distance and a velocity in a medium;
    deriving a temporary line-shape first arrival expected location from the temporary first arrival values in the transform set;
    subtracting a temporary first arrival value of a large deviation from the temporary line-shape first arrival expected location in the transform set;
    deriving a true line-shape first arrival expected location from remaining temporary first arrival values in the transform set;
    deriving a true first arrival selection range by adding or subtracting an error value to or from the true line-shape first arrival expected location in the transform set; and
    selecting a true first arrival value within the true first arrival selection range.

2. The method of claim 1, wherein,
subtracting the temporary first arrival value of a large deviation from the temporary line-shape first arrival expected location in the transform set is performed until a standard deviation and a standard deviation decrease rate of the temporary first arrival values becomes less than an arbitrary target value.

3. A method of claim 1, wherein,
in the step of deriving the temporary line-shape first arrival expected location from the temporary first arrival values,
the temporary line-shape first arrival expected location is an average value or fitted line in the transform set.

4. A method of claim 1, wherein,
in the step of deriving the true line-shape first arrival expected location from remaining temporary first arrival values,
the true line-shape first arrival expected location is an average value or fitted line in the transform set.

* * * * *